(12) United States Patent
Kutthumolu et al.

(10) Patent No.: US 12,499,491 B2
(45) Date of Patent: Dec. 16, 2025

(54) INTELLIGENT PLATFORM FOR AUDIT RESPONSE USING A META VERSE-DRIVEN APPROACH FOR REGULATOR REPORTING REQUIREMENTS

(71) Applicant: Bank of America Corporation, Charlotte, NC (US)

(72) Inventors: Durga Prasad Kutthumolu, Hyderabad (IN); Susheel Chiluka, Hyderabad (IN); Saravana Kumar PD, Hyderabad (IN); Yegappan Alagappan, Chennai (IN); Ravikanth Tadepally, Hyderabad (IN); Navin Singh, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 403 days.

(21) Appl. No.: 18/058,832

(22) Filed: Nov. 25, 2022

(65) Prior Publication Data
US 2024/0177243 A1    May 30, 2024

(51) Int. Cl.
*G06Q 40/12*    (2023.01)
*G06T 13/40*    (2011.01)

(52) U.S. Cl.
CPC ............. *G06Q 40/12* (2013.12); *G06T 13/40* (2013.01)

(58) Field of Classification Search
CPC .......... G06Q 40/12; G06T 13/40; G06F 3/011
See application file for complete search history.

(56) References Cited

U.S. PATENT DOCUMENTS

| | | |
|---|---|---|
| 7,775,885 B2 | 8/2010 | Van Luchene et al. |
| 8,230,045 B2 | 7/2012 | Kawachiya et al. |
| 8,245,283 B2 | 8/2012 | Dawson et al. |
| 8,738,715 B2 | 5/2014 | Roy et al. |
| 9,235,319 B2 | 1/2016 | Finn et al. |
| 9,466,278 B2 | 10/2016 | Rosedale et al. |
| 9,563,902 B2 | 2/2017 | Haswell et al. |
| 9,875,580 B2 | 1/2018 | Cannon et al. |
| 9,895,612 B2 | 2/2018 | Pacey et al. |
| 10,326,667 B2 | 6/2019 | Jones et al. |
| 11,017,391 B1 | 5/2021 | Winklevoss et al. |
| 11,139,955 B1 | 10/2021 | So et al. |
| 11,282,139 B1 | 3/2022 | Winklevoss et al. |

(Continued)

OTHER PUBLICATIONS

Sun et al., "Buyers Satisfaction in a Virtual Fitting Room Scenario Based on Realism of Avatar", 2015, IEEE Symposium on 3D User Interfaces, 183-84 (Year: 2015).*

(Continued)

*Primary Examiner* — Fahd A Obeid
*Assistant Examiner* — Jessica E Sullivan
(74) *Attorney, Agent, or Firm* — Banner & Witcoff, Ltd.

(57) ABSTRACT

Aspects of the disclosure describe methods and systems involving separate, parent (e.g., public) and child (e.g., private) metaverses with varying confidentiality and access privileges for auditor users, financial analyst users, regulatory users, and other virtual reality/metaverse users to interact in a fully immersive, real-time manner (e.g., using an immersive query modulation engine) to fulfill audit and regulatory reporting requirements, including extracting information from heterogeneous data stores, recordkeeping of audit responses for regulatory purposes, and maintaining access privileges of varying user profiles.

20 Claims, 8 Drawing Sheets

(56) References Cited

U.S. PATENT DOCUMENTS

| | | | |
|---|---|---|---|
| 2004/0225632 A1* | 11/2004 | Benson | G06F 16/27 |
| 2009/0170604 A1 | 7/2009 | Mueller et al. | |
| 2015/0295866 A1* | 10/2015 | Collet | G10L 15/26 |
| | | | 709/206 |
| 2015/0379046 A1 | 12/2015 | Sundaresan et al. | |
| 2016/0350973 A1* | 12/2016 | Shapira | G06F 3/011 |
| 2017/0213169 A1 | 7/2017 | Chaturvedi et al. | |
| 2020/0019863 A1* | 1/2020 | Dua | G06F 16/313 |
| 2022/0248955 A1 | 8/2022 | Tran | |

OTHER PUBLICATIONS

NPL 1: Park et al. (2022), A Metaverse: Taxonomy, components, applications, and open challenges, IEEE Access.
NPL 2: Dionisio et al. (2013), 3D Virtual Worlds and the Metaverse: Current Status and Future Possibilities, ACM Computing Surveys 45, 3, Article 34.

\* cited by examiner

| Keyword_1 (Auditor_name) | Keyword_2 (Demographic_fi d_1) | Keyword_3 (Demographic_fi d_2) | Keyword_4 (Email_tuned_n ote) | Keyword_5 | Keyword_6 | Target Variable (Action_taken) Raw Query Text |
|---|---|---|---|---|---|---|
| AX | BX | CX | DX | EX | FX | Given a table < Auditor_Name or Chmstr_Name > with Column names Account no, Ticket Ref. belongs to Auditor XYZ |
| AY | BY | CY | DY | EY | FY | Given a table < Auditor_Name or Chmstr_Name > with Column names Account no, Ticket Ref. belongs to Auditor XYZ with rows as abcdefg, 1234567 |

INTELLIGENT PLATFORM FOR AUDIT RESPONSE USING A META VERSE-DRIVEN APPROACH FOR REGULATOR REPORTING REQUIREMENTS

FIELD

Aspects of the disclosure relate to computers, networking, hardware, and software. In particular, one or more aspects of the disclosure relate to a metaverse-based intelligent audit platform.

BACKGROUND

Financial institutions (e.g., banks) must comply with regulatory requirements to satisfy multiple audits throughout the year. The process to respond to auditors starts with searching for the requested data across heterogeneous systems with their own unique database structures and metadata. A standalone query may not suffice to meet the dynamic requirements coming from the regulators. Additionally, there is the complexity of generating multiple queries based on the time requirement and determining which query and/or dataset has the highest data quality amongst the heterogeneous systems. Moreover, this audit activity is time critical as auditors are waiting in a queue for responses to their queries. The auditing process is not without its shortcoming. One or more disadvantages in prior art systems for conducting audits could be improved.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure provide effective, efficient, scalable, and convenient technical solutions that address various issues in the prior art. These and additional aspects will be appreciated with the benefit of the disclosures discussed in further detail below. Moreover, the figures herein illustrate the foregoing embodiments in detail.

In one embodiment, a novel method and system are disclosed involving separate, parent (e.g., public) and child (e.g., private) metaverses with varying confidentiality/access privileges for auditor users, financial analyst users, regulatory users, and other virtual reality (VR)/metaverse users to interact in a fully immersive, real-time manner (e.g., using an immersive query modulation engine) to fulfill audit and regulatory reporting requirements, including extracting information from heterogeneous data stores, recordkeeping of audit responses for regulatory purposes, and maintaining access privileges of varying user profiles.

In one embodiment, a method involving a collaborative metaverse application is described herein. The method comprises receiving, in a parent virtual immersive computing environment, by a computing device and from a first user, an audit request for information. The first user has access to the parent virtual immersive computing environment. The method further comprises receiving, in a child virtual immersive computing environment and by the computing device, messages from heterogeneous data stores and converting at least one of the received messages into three-dimensional (3D) visual content. Additionally, the method comprises causing, via a virtual reality headset of a second user and within a virtual reality headset associated with the first user, output of the 3D visual content in the parent virtual immersive computing environment. The second user has access to the parent virtual immersive computing environment and the child virtual immersive computing environment.

In one embodiment, a novel method and system are directed to a metaverse platform (e.g., an extended reality (XR) platform) that uses a contextual linguistic engine and immersive query modulation engine to extract keywords from user-inputted natural language to identify metadata queries specific to heterogeneous systems of record so that the returned data can be transformed using a 3D-word generative adversarial network (GAN) algorithm into immersive data for sharing in the metaverse platform with auditors and other users. The contextual linguistic engine may comprise natural language processing (NPL) and generative pre-trained transformer (GTP) language transformers (e.g., GTP-3, GTP-J).

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 5 depicts an illustrative database table in accordance with one or more illustrative aspects described herein.

DETAILED DESCRIPTION

Figure 1:
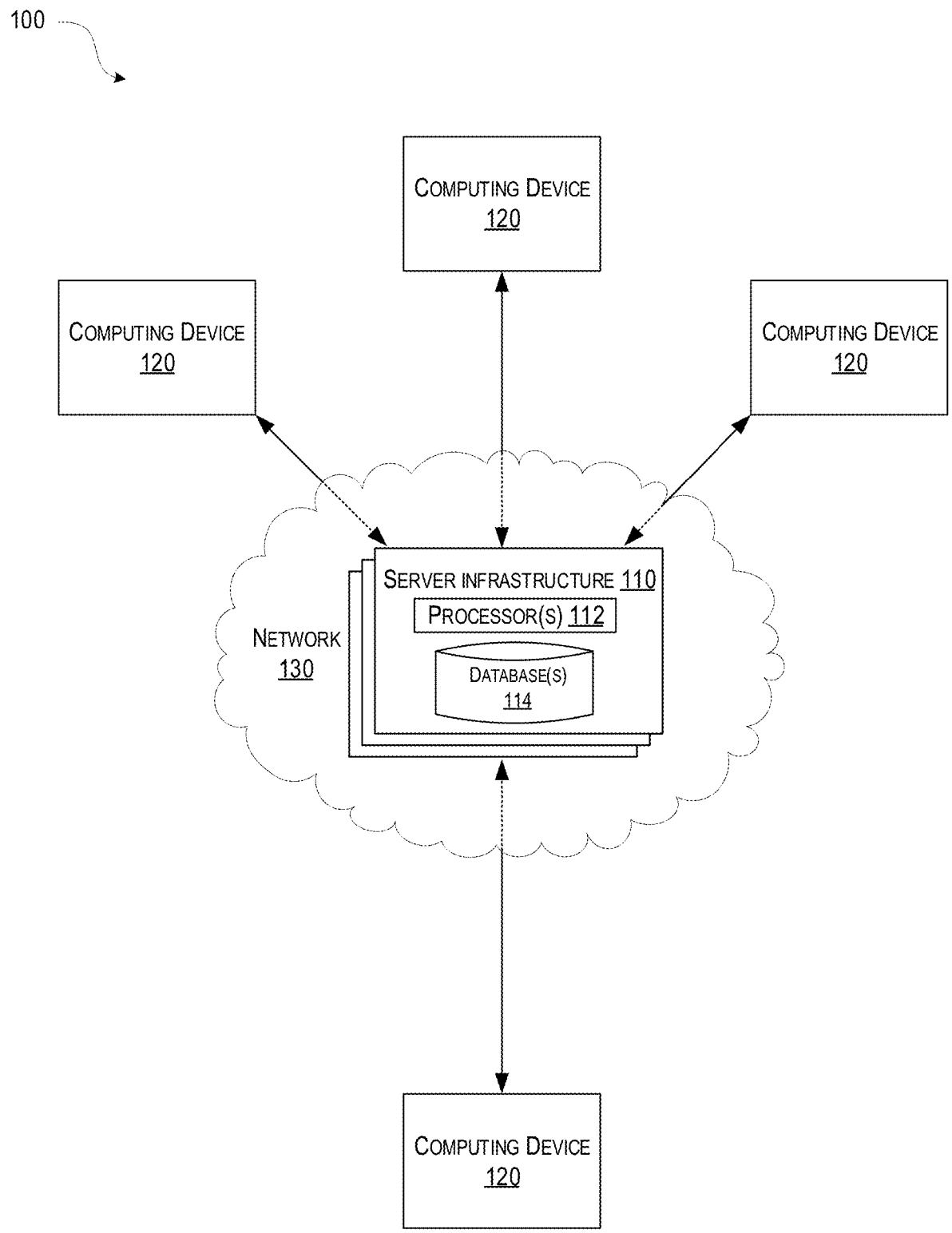
FIG. 1 depicts an illustrative example of a computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Financial institutions (e.g., banks) have a legal requirement to undergo audits regularly to comply with laws and regulatory requirements, as well as industry standards throughout the year. Auditors may request various documents and information to make sure a financial institution is operating under the law the regulations. The process to respond to the auditors may start with searching for the requested data across heterogeneous systems with their own unique database structures and metadata. A standalone query for all the heterogeneous systems may not suffice to meet the dynamic requirements from the auditors. Additionally, there is the complexity of generating multiple queries based on the time requirement and determining which query and/or dataset has the highest data quality amongst the heterogeneous systems. The process to respond to the auditors is generally time sensitive because the auditors are waiting for the financial institutions' responses to investigate financial institutions' financial activities and procedures and risk management processes, and then need to compile reports within a certain period of time.

As a general introduction to the subject matter described in more detail below, aspects described herein are directed towards the methods and systems disclosed herein.

Aspects of this disclosure provide effective, efficient, scalable, and convenient technical solutions that address various issues associated with the regulatory requirements that a financial institution must evidence compliance with regulatory requirements throughout multiple audits in a year. Responding to auditors' requests may require querying multiple, heterogeneous systems (e.g., data stores, data applications), each with their own unique database structures and metadata such that a standalone query will not suffice. The heterogeneous systems may comprise, for example, a system type 1 Hadoop, a system type 2 Oracle SQL, a system type N Microsoft SQL. Some of the complexities and challenges include: (1) there are various regulatory audit requests that are posed to the financial analysts in the financial institution; (2) financial analysts need to respond back to the auditors within a predefined accepted service level agreement (SLA); (3) requests may be towards any trades that happened, such as for example: please list down all trades done by a particular client on a particular date; please detail all executions that correspond to an order with a particular order ID placed by the client; and list trades which happened against a particular security either directly or through derivatives by a particular client on a particular date; (4) analysts need to dig through various heterogeneous systems for answering these queries; (5) analysts do not have a real time interaction with auditors, e.g., interaction is limited to traditional methods of communication, which may lead to multiple iterations to clarify questions and/or responses; and (6) data provided as is in plain textual form and no additional insight gets added, or a pictorial form provided.

Aspects of the present disclosure describe that audit responses may be submitted via a metaverse platform created for auditors to interact with analysts in a real-time 3D immersive virtual universe. This will enable effective responses to regulatory requests from regulators or auditors. All the stakeholders may be equipped with VR devices integrated with graphic chipsets, storage components, and external tracking cameras that follow the position of the head and hands. These devices may be driven by a multi-cloud internet of things (IoT) mechanism. Users (e.g., auditors, regulators, financial analysts, etc.) may have avatars and may log into the metaverse based on the defined authentications/authorizations. Users may have options to interact with a chatbot or with analysts. They can use their services to extract audit requests from e-mail/third party applications or directly from the regulators. Furthermore, user requests may be received in the form of: (1) 3D formats, (2) 2D formats (e.g., e-mail), (3) voice, and/or (4) other formats.

FIG. 1 depicts an illustrative example of computer system 100 in accordance with one or more illustrative aspects described herein. Computer system 100 may comprise one or more computing devices including at least server infrastructure 110 and computing devices 120. Each of computing devices 120 may be configured to communicate with server infrastructure 110 through network 130. In some arrangements, computer system 100 may include additional computing devices and networks that are not depicted in FIG. 1, which also may be configured to interact with server infrastructure 110 and, in some instances, computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks and for interacting with computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate data received from the various computing devices 120, which may be stored in databases 114.

Each of the computing devices 120 may be configured to interact with server infrastructure 110 through network 130. In some instances, one or more of the computing devices 120 may be configured to receive and transmit information corresponding to system requests through particular channels and/or representations of webpages and/or applications associated with server infrastructure 110. The system requests provided by computing devices 120 may initiate the performance of particular computational functions such as data and/or file transfers at server infrastructure 110. In such instances, the one or more of the computing devices may be internal computing devices associated with the particular entity corresponding to server infrastructure 110 and/or may be external computing devices which are not associated with the particular entity.

As stated above, computer system 100 also may include one or more networks, which may interconnect one or more of server infrastructure 110 and one or more computing devices 120. For example, computer system 100 may include network 130. Network 130 may include one or more sub-networks (e.g., local area networks (LANs), wide area networks (WANs), or the like). Furthermore, computer system 100 may include a local network configured to interlink each of the computing devices comprising server infrastructure 110.

Furthermore, in some embodiments, computer system 100 may include a plurality of computer systems arranged in an operative networked communication arrangement with one another through a network, which may interface with server infrastructure 110, computing devices 120, and network 130. The network may be a system specific distributive network receiving and distributing specific network feeds and identifying specific network associated triggers. The network may also be a global area network, such as the Internet, a wide area network (WAN), a local area network (LAN), or any other type of network or combination of networks. The network may provide for wireline, wireless, or a combination wireline and wireless communication between devices on the network.

In the computer system 100 described in regard to FIG. 1, server infrastructure 110 may serve as a central authority which manages at least a portion of the computing data and actions performed in relation to the particular entity associated with server infrastructure 110. Decentralized computing arrangements are also contemplated and disclosed herein such that server infrastructure 110 need not be centralized.

Figure 2:
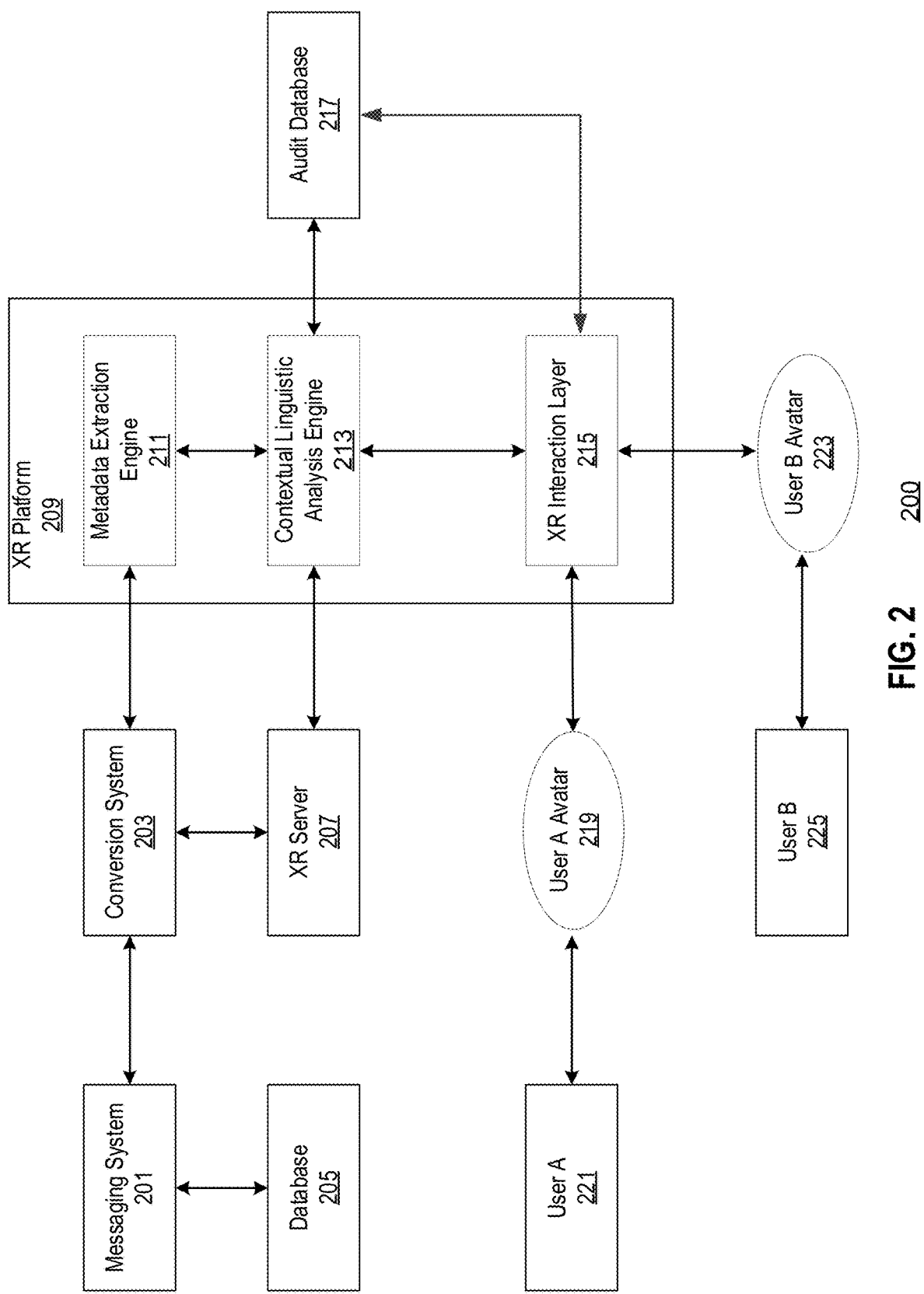
FIG. 2 depicts an illustrative example architecture in accordance with one or more illustrative aspects described herein.

Referring to FIG. 2, an illustrative example architecture is disclosed in accordance with one or more illustrative aspects. The various components in the architecture interact and illustrate the flow of auditor requests through a metaverse-enabled system for financial analysts' responses to such requests.

A messaging system 201 may send a request (e.g., message, text, email, chat, voice) to a financial institution. The messaging system 201 may obtain information about the financial institution from a database 205 for generating the request. The request may require the financial institution to provide an audit response (e.g., information about certain financial activities). For example, the request may comprise (1) list trades done by a particular client on a particular date; (2) detail all executions that correspond to an order with a particular order ID placed by a client; and/or (3) list trades against a particular security either directly or through derivatives by a particular client on a particular date. The database 205 may store the previous requests for the financial institution.

A computing device (e.g., the server infrastructure 110) may receive the request and send the request to a conversion system 203. The conversion system 203 may be part of the computing device or may be part of a different computing device. The conversion system 203 may receive the request and convert the content of the request into 3D visual content (e.g., 3D images, 3D videos). For example, the conversion system 203 may convert an email into a 3D visual email. The email may comprise an audit request for a financial institution. The conversion system 203 may convert the content of the request into 3D visual content based on one or more neural network models and/or algorithms (e.g., GAN algorithms, deep convolutional GAN algorithms, autoencoding GAN algorithms).

The conversion system 203 may cause output (e.g., sending) of the request in the 3D form in a virtual computing environment. For example, an auditor may be represented by a first avatar in a metaverse application (e.g., an immersive virtual world enabled by VR, augmented reality (AR), and/or XR techniques). The auditor may send the request to the financial institution in the virtual computing environment. For example, a financial analyst of the financial institution may be represented by a second avatar and receive the request in the 3D form and/or other inputs from the first avatar in the virtual computing environment. Additional details about the interactions of the avatars will be further described herein.

The conversion system 203 may send the request to an XR server 207 and/or an XR platform 209 (e.g., the server infrastructure 110). The request may be in the 3D form or may be in the traditional 2D form (e.g., email). The XR server 207 and the XR platform 209 may be associated with the financial institution and/or the financial analyst that receives the request. Although the XR Server 207 is shown logically separated from the XR platform 209 in FIG. 2, that in some embodiments, the XR server 207 can be conflated into the XR platform 209. The XR platform 209 may comprise a metadata extraction engine 211, a contextual linguistic analysis engine 213, and an XR interaction layer 215. The XR server 207 may perform at least those functions needed to interact between the conversion system 203 and the contextual linguistic analysis engine 213 as well as other functions.

The metadata extraction engine 211 may determine (e.g., extract) metadata from the request. For example, the metadata may comprise keywords (e.g., key data elements (KDE)) associated with the request such as account number, auditor name, ticket reference number, and loan number. The determination of metadata may be performed based on NPL, which may involve one or more deep learning models such as bidirectional encoder representations from transformers (BERT)-based linguistic algorithms. If the request is in the form of voice (e.g., speech), the metadata extraction engine 211 may convert the voice to text and determine the metadata based on the text. Before extracting the metadata from the request, the metadata extraction engine 211 or another device may remove noise (e.g., punctuation and accents, special characters, numeric digits) from the content of the request.

The contextual linguistic analysis engine 213 may analyze the extracted metadata and map the extracted metadata with data in an audit database 217. The audit database 217 may be a database management system in which information is represented in the form of objects as used in object-oriented programming. The audit database 217 may store data associated with a plurality of objects (e.g., auditor names, emails, email metadata, outcomes associated with the emails). The objects in the audit database 217 may be keywords associated with audit requests. The audit database 217 may store data from various heterogeneous data sources. Alternatively, each audit database 217 may be associated with only one heterogeneous data source.

Referring to FIG. 5, a database table 500 is illustrated in accordance with one or more illustrative aspects described herein. The audit database 217 may store the database table 500 (and other tables) to store data associated with historical audit requests for a period of time (e.g., 10 years). For example, the database table 500 may store a plurality of keywords associated with a plurality of historical audit requests. The keywords may comprise auditor name, demographic information, content of auditor request (e.g., email), a result of the auditor request, and/or other key information associated with the audit requests. Each keyword may be a column in the database table 500 and the data for each keyword may be in the rows of that column.

As shown in the database table 500, the data under each keyword column may be generated from a previous request (e.g., an email, email_tuned_note). The contextual linguistic analysis engine 213 may comprise an NPL logical component that generates a target variable column (e.g., a raw database query). The content of the target variable column may be of a different format than the content of other columns. The contextual linguistic analysis engine 213 may analyze the extracted metadata and convert the extracted metadata into a different format. For example, the target variable may be in a GPT-3 enabled format, which may be algorithmically generated based on a GPT model by using email_tuned_note and the determined keywords as the input. For example, as shown in the database table 500, a raw database query may be "Given a table <Auditor_Name or Chmstr_Name> with Column names Account no, Ticket Ref. belongs to Auditor XYZ." This raw query may be used as an input for another deep learning model (e.g., another GPT model) for generating one or more database queries. Each of the database queries may be specific to a particular heterogeneous data source.

After the contextual linguistic analysis engine 213 receives the extracted metadata of a request from the metadata extraction engine 211, the contextual linguistic analysis engine 213 may analyze the extracted metadata from the request and compare each keyword in the metadata to the actual data (e.g., objects, columns in the database table 500) stored in the audit database 217. Based on the comparison, the contextual linguistic analysis engine 213 may determine that one or more keywords match the objects stored in the audit database 217 and may extract (e.g., pull, retrieve) all the data associated with the matched objects to generate one or more raw database queries. For example, the contextual linguistic analysis engine 213 may determine that the auditor name in the request matches the auditor name stored in the database table 500. The contextual linguistic analysis engine 213 may extract all the data from each row under the keyword_1 (Auditor_name) column in the database table 500 to generate one or more raw database queries based on the extracted data. The contextual linguistic analysis engine 213 may convert the one or more raw database queries into one or more database queries for a plurality of heterogeneous data sources. Additionally, the keywords of the request may be used to retrain the deep learning models to generate the raw database queries and/or the database queries.

The contextual linguistic analysis engine 213 may receive a response to the database query from each of the plurality of heterogeneous data sources. The contextual linguistic analysis engine 213 may compare the data quality in the responses and determine the highest quality of the response among the received responses. For example, the contextual linguistic analysis engine 213 may apply weight-based data quality metrics to identify one of the plurality of heterogeneous data sources with the highest data quality. The contextual linguistic analysis engine 213 may retrieve the relevant data from the one of the plurality of heterogeneous data sources with the highest data quality (e.g. use a WHERE and SELECT clause based on the identified keywords). The retrieved data may be converted into a message for responding to the request.

The XR interaction layer 215 may be a server on the XR platform 209. The XR interaction layer 215 may receive the retrieved data from the contextual linguistic analysis engine 213 and convert the data into 3D visual content based on one or more neural network models and/or algorithms. For example, the XR interaction layer 215 may convert the data into a 3D visual email (e.g., 3D graphic HTML email) based on a neural network model. The 3D visual email may comprise a response to a request for certain financial information of a financial institution.

The XR interaction layer 215 may cause output of the 3D visual content to one or more users and/or user avatars in a virtual computing environment. For example, the XR interaction layer 215 may be associated with a collaborative metaverse application that allows multiple users to interact using VR and/or AR headsets or web-based VR or AR devices in a virtual world. The metaverse application may be directed to facilitating and managing audit responses. A VR or AR headset may be a head-mounted device that provides virtual reality for the user. The VR or AR headset may be integrated with graphic chipsets, storage components, and external tracking cameras that can track and follow the position of the head and hands of the user. A web-based VR or AR (e.g., WebXR) device may use a web application programming interface (API) that supports a VR or AR device. The VR or AR headset and a Web-XR device may enable the user to experience the virtual world and interactive CGI, and support 3D models within the user interface. In some examples, the XR interaction layer 215 may send the retrieved data to another computing device, for example, via an email, without converting the data into 3D visual content.

Various users may log into the virtual computing environment. For example, user A 221 may log into the XR platform 209 or is an authorized user of the XR platform 209 with a user account. User A 221 may create user A avatar 219 in a virtual computing environment created by the XR platform 209 (e.g., the XR interaction layer 215). User A 221 may be a financial analyst with the financial institution that receives the request. Similarly, user B 225 may log into the XR platform 209 or is an authorized user of the XR platform 209 with a different user account. User B 225 may create User B avatar 223 in the virtual computing environment. User B 225 may be an auditor who sends the request to the financial institution (e.g., via the messaging system 201). Additionally, other users (e.g., third parties, vendors) may log into the virtual computing environment to interact with user A avatar 219 and/or user B avatar 223.

User A avatar 219 may receive the 3D visual content from the XR interaction layer 215. User A avatar 219 may send the 3D visual content to user B avatar 223 via, for example, a 3D visual email. Additionally or alternatively, user A avatar 219 and user B avatar 223 may be located in the same virtual space (e.g., in the same room) of the virtual computing environment. User A avatar 219 may start a conversation with user B avatar 223, and display the 3D visual content to user B avatar 223. For example, user A avatar 219 may share a screen with user B avatar 223 in the virtual computing environment. Additionally or alternatively, user A avatar 219 may cause output of the 3D visual content within a VR reality headset of user B 225. Other avatars (e.g., a third party avatar, a financial expert avatar, an attorney avatar) may also be present in the same virtual space with user A avatar 219 and user B avatar 223, and interact with user A avatar 219 and/or user B avatar 223.

User A avatar 219 may also send the 3D visual content to other avatars. User B avatar 223 may receive and/or view the 3D visual content. User B avatar 223 may provide comments on the 3D visual content, and send the comments to user A avatar.

The output of the 3D visual content may comprise an interactive selection option (e.g., a button) associated with the 3D visual content. The selection of the interactive selection option may cause submission, approval, or denial of the 3D visual content. For example, if the 3D visual content comprises a response to the audit request, an approval button may be output next to the response to the audit request and allow a user (e.g., user B 225) to approve the response. In another example, a "submit" button may be output next to the 3D visual content and may allow a user (e.g., user A 221) to send the 3D visual content to a different user and/or a computing device. As another example, an "analyze" button may be output next to the 3D visual content and may allow a user to analyze the 3D visual content (e.g., request additional information, view additional information of a part of the 3D visual content).

Figure 3:
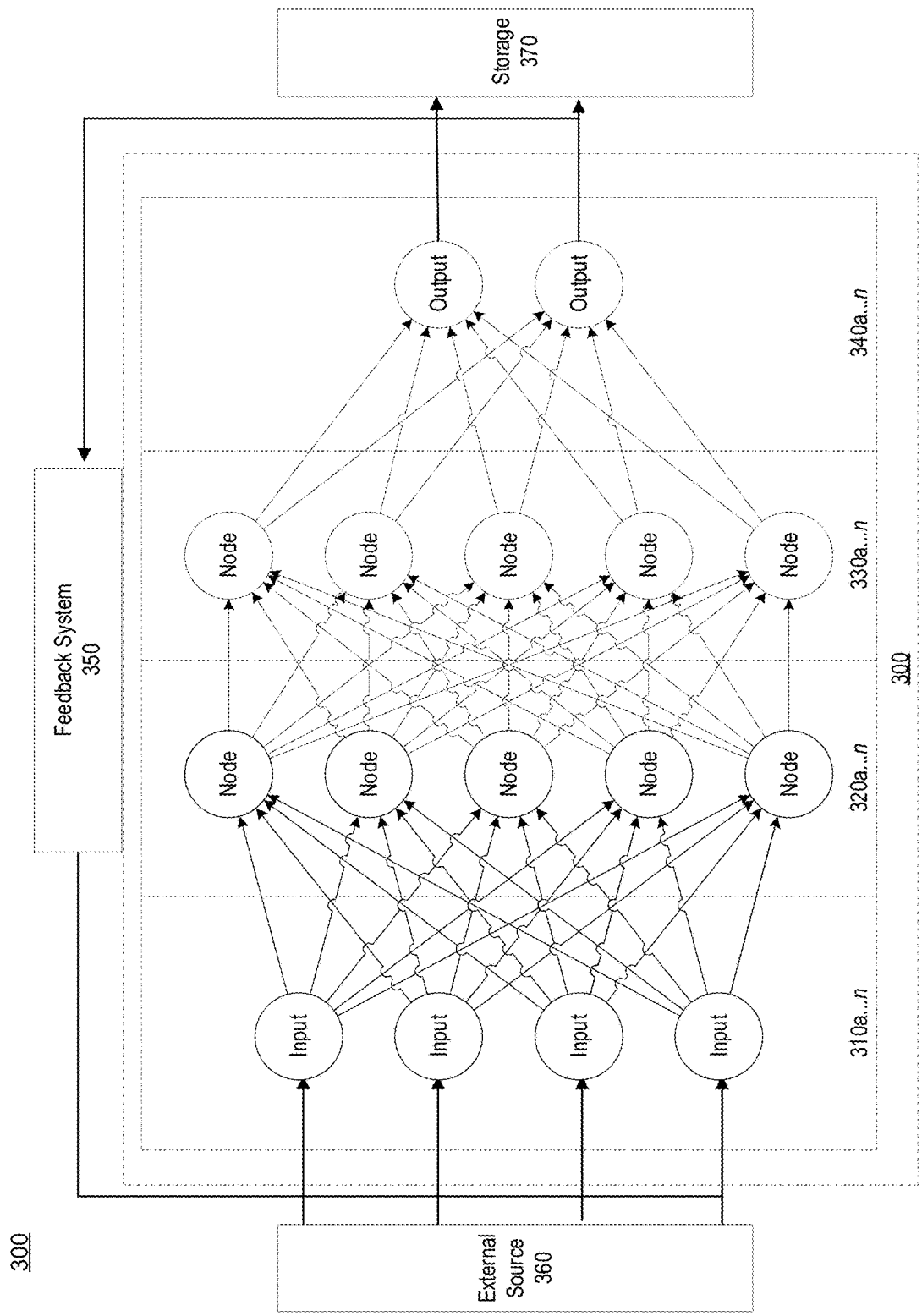
FIG. 3 shows an illustrative artificial neural network on which a machine learning algorithm may be executed in accordance with one or more examples described herein.

FIG. 3 illustrates a simplified example of an artificial neural network 300 on which a machine learning algorithm may be executed. FIG. 3 is merely an example of nonlinear processing using an artificial neural network; other forms of nonlinear processing may be used to implement a machine learning algorithm in accordance with features described herein. The artificial neural network 300 may be used to determine the GAN algorithms and/or the GPT models described in connection to FIG. 2.

By way of background, a framework for machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator. An embodiment involving unsupervised machine learning is described herein.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 100 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct"). An embodiment involving supervised machine learning is described herein.

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

As elaborated herein, in practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out." also reigns true in machine learning systems.

In FIG. 3, each of input nodes 310*a-n* is connected to a first set of processing nodes 320*a-n*. Each of the first set of processing nodes 320*a-n* is connected to each of a second set of processing nodes 330*a-n*. Each of the second set of processing nodes 330*a-n* is connected to each of output nodes 340*a-n*. Though only two sets of processing nodes are shown, any number of processing nodes may be implemented. Similarly, though only four input nodes, five processing nodes, and two output nodes per set are shown in FIG. 3, any number of nodes may be implemented per set. Data flows in FIG. 3 are depicted from left to right: data may be input into an input node, may flow through one or more processing nodes, and may be output by an output node. Input into the input nodes 310*a-n* may originate from an external source 360. Output may be sent to a feedback system 350 and/or to a storage 370. The feedback system 350 may send output to the input nodes 310*a-n* for successive processing iterations with the same or different input data.

In one illustrative method using feedback system 350, the system may use machine learning to determine an output. The output may include anomaly scores, heat scores/values, confidence values, and/or classification output. The system may use any machine learning model including xgboosted decision trees, auto-encoders, perceptron, decision trees, support vector machines, regression, and/or a neural network. The neural network may be any type of neural network including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network, the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting—regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially. In one example, optimization comprises minimizing the number of false positives to maximize a user's experience. Alternatively, an optimization function may minimize the number of missed positives to optimize minimization of losses.

In one example, FIG. 3 depicts nodes that may perform various types of processing, such as discrete computations, computer programs, and/or mathematical functions implemented by a computing device. For example, the input nodes 310*a-n* may comprise logical inputs of different data sources, such as one or more data servers. The processing nodes 320*a-n* may comprise parallel processes executing on multiple servers in a data center. And, the output nodes 340*a-n* may be the logical outputs that ultimately are stored in results data stores, such as the same or different data servers as for the input nodes 310*a-n*. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network 300 may learn and/or be dynamically reconfigured. Though nodes are depicted as having connections only to successive nodes in FIG. 3, connections may be formed between any nodes. For example, one processing node may be configured to send output to a previous processing node.

Input received in the input nodes 310*a-n* may be processed through processing nodes, such as the first set of processing nodes 320*a-n* and the second set of processing nodes 330*a-n*. The processing may result in output in output nodes 340*a-n*. As depicted by the connections from the first set of processing nodes 320*a-n* and the second set of processing nodes 330*a-n*, processing may comprise multiple steps or sequences. For example, the first set of processing nodes 320*a-n* may be a rough data filter, whereas the second set of processing nodes 330*a-n* may be a more detailed data filter.

The artificial neural network 300 may be configured to effectuate decision-making. As a simplified example for the purposes of explanation, the artificial neural network 300 may be configured to detect faces in photographs. The input nodes 310*a-n* may be provided with a digital copy of a photograph. The first set of processing nodes 320*a-n* may be each configured to perform specific steps to remove non-facial content, such as large contiguous sections of the color red. The second set of processing nodes 330*a-n* may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network 100 may then predict the location on the face. The prediction may be correct or incorrect.

The feedback system 350 may be configured to determine whether or not the artificial neural network 300 made a correct decision. Feedback may comprise an indication of a correct answer and/or an indication of an incorrect answer and/or a degree of correctness (e.g., a percentage). For example, in the facial recognition example provided above, the feedback system 350 may be configured to determine if the face was correctly identified and, if so, what percentage of the face was correctly identified. The feedback system 350 may already know a correct answer, such that the feedback system may train the artificial neural network 100 by indicating whether it made a correct decision. The feedback system 350 may comprise human input, such as an administrator telling the artificial neural network 300 whether it made a correct decision. The feedback system may provide feedback (e.g., an indication of whether the previous output was correct or incorrect) to the artificial neural network 300 via input nodes 310a-n or may transmit such information to one or more nodes. The feedback system 350 may additionally or alternatively be coupled to the storage 370 such that output is stored. The feedback system may not have correct answers at all, but instead base feedback on further processing: for example, the feedback system may comprise a system programmed to identify faces, such that the feedback allows the artificial neural network 300 to compare its results to that of a manually programmed system.

The artificial neural network 300 may be dynamically modified to learn and provide better input. Based on, for example, previous input and output and feedback from the feedback system 350, the artificial neural network 300 may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 100, such that the artificial neural network 100 may vary its nodes and connections to test hypotheses.

The artificial neural network 300 need not have a set number of processing nodes or number of sets of processing nodes, but may increase or decrease its complexity. For example, the artificial neural network 300 may determine that one or more processing nodes are unnecessary or should be repurposed, and either discard or reconfigure the processing nodes on that basis. As another example, the artificial neural network 100 may determine that further processing of all or part of the input is required and add additional processing nodes and/or sets of processing nodes on that basis.

The feedback provided by the feedback system 350 may be mere reinforcement (e.g., providing an indication that output is correct or incorrect, awarding the machine learning algorithm a number of points, or the like) or may be specific (e.g., providing the correct output). For example, the machine learning algorithm 300 may be asked to detect faces in photographs. Based on an output, the feedback system 350 may indicate a score (e.g., 75% accuracy, an indication that the guess was accurate, or the like) or a specific response (e.g., specifically identifying where the face was located).

The artificial neural network 300 may be supported or replaced by other forms of machine learning. For example, one or more of the nodes of artificial neural network 300 may implement a decision tree, associational rule set, logic programming, regression model, cluster analysis mechanisms, Bayesian network, propositional formulae, generative models, and/or other algorithms or forms of decision-making. The artificial neural network 300 may effectuate deep learning.

In another example, an unsupervised machine learning engine may use an autoencoder technique to detect anomalies within the graph. The autoencoder may be constructed with a number of layers that represent the encoding portion of the network and a number of layers that represent the decoding portion of the network. The encoding portion of the network may output a vector representation of inputs into the encoder network, and the decoding portion of the network may receive as input a vector representation generated by the encoding portion of the network. It may then use the vector representation to recreate the input that the encoder network used to generate the vector representation.

The autoencoder may be trained on historical data or feature vectors that are known to not be fraudulent. By training on non-fraudulent feature vectors, the autoencoder may learn how a non-fraudulent entity behaves. When the autoencoder encounters a feature vector that is different from the feature vectors it has trained on, the unsupervised machine learning engine may flag the feature vector as potentially fraudulent.

The autoencoder may be a variational autoencoder, in some examples. The variational autoencoder may include the components of the autoencoder. The variational autoencoder may also include a constraint on its encoding network that forces it to generate vector representations of inputs according to a distribution (e.g., a unit Gaussian distribution).

Figure 4:
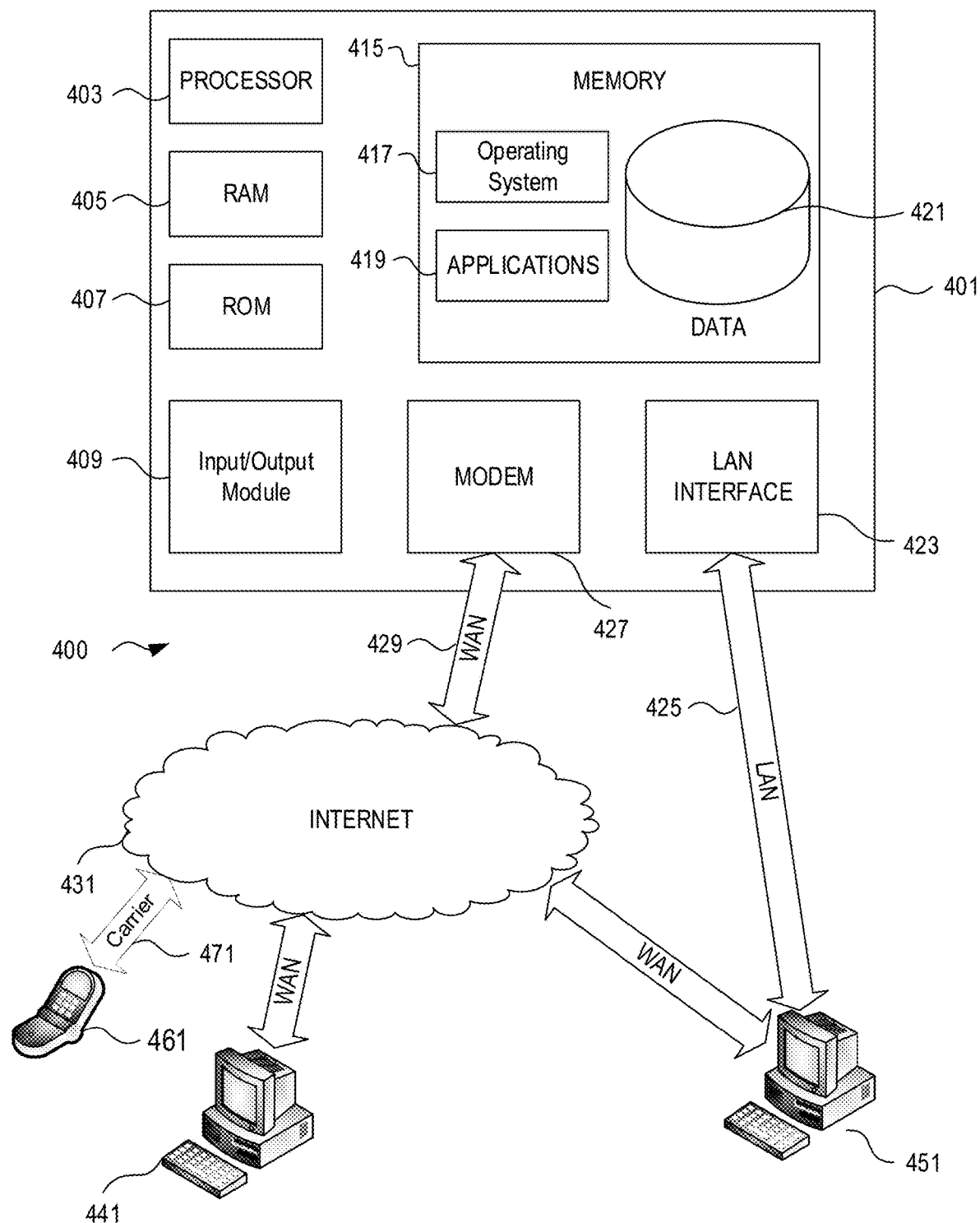
FIG. 4 depicts an illustrative example of a suitable computing system environment that may be used in accordance with one or more illustrative aspects described herein.

FIG. 4 illustrates an example of a computing system environment 400 that may be used according to one or more illustrative embodiments. The computing system environment 400 is only one example of a suitable computing environment and is not intended to suggest any limitation as to the scope of use or functionality contained in the disclosure. The computing system environment 400 should not be interpreted as having any dependency or requirement relating to any one or combination of components shown in the computing system environment 400.

The disclosure is operational with numerous other general purpose or special purpose computing system environments or configurations. Examples of the following computing systems, environments, and/or configurations that may be suitable for use with the disclosed embodiments include, but are not limited to, personal computers (PCs), server computers, hand-held or laptop devices, virtual reality headsets, multiprocessor systems, microprocessor-based systems, set top boxes, programmable consumer electronics, network PCs, minicomputers, mainframe computers, distributed computing environments that include any of the above systems or devices, and the like.

With reference to FIG. 4, the computing system environment 400 may include a computing device 401 (e.g., the XR server 207, the XR platform 209, the contextual linguistic analysis engine 213, the XR interaction layer 215) wherein the processes discussed herein may be implemented. The computing device 401 may have a processor 403 for controlling overall operation of the computing device 401 and its associated components, including random-access memory (RAM) 405, read-only memory (ROM) 407, input/output module or communications module 409, and memory 415. Computing device 401 typically includes a variety of computer readable media. Computer readable media may be any available media that may be accessed by computing device 401 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 401.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 400 may also include optical scanners (not shown). Exemplary usages include scanning and converting paper documents, e.g., correspondence, receipts to digital files.

Although not shown, RAM 405 may include one or more applications representing the application data stored in RAM 405, while the computing device is on and corresponding software applications (e.g., software tasks) are running on the computing device 401.

Communications module 409 may include a microphone, keypad, touch screen, and/or stylus through which a user of computing device 401 may provide input, and may also include one or more of a speaker for providing audio output and a video display device for providing textual, audiovisual and/or graphical output.

Software may be stored within memory 415 and/or storage to provide instructions to processor 403 for enabling computing device 401 to perform various functions. For example, memory 415 may store software used by the computing device 401, such as an operating system 417, application programs 419, and an associated database 421. Also, some or all of the computer executable instructions for computing device 401 may be embodied in hardware or firmware.

Computing device 401 may operate in a networked environment supporting connections to one or more remote computing devices, such as computing devices 441, 451, and 461. The computing devices 441, 451, and 461 may be personal computing devices or servers that include many or all of the elements described above relative to the computing device 401. Computing device 461 may be a mobile device communicating over wireless carrier channel 471.

The network connections depicted in FIG. 4 include a local area network (LAN) 425 and a wide area network (WAN) 429, but may also include other networks. When used in a LAN networking environment, computing device 401 may be connected to the LAN 425 through a network interface, such as LAN interface 423, or to an adapter in the communications module 409. When used in a WAN networking environment, the computing device 401 may include a modem in the communications module 409, a modem separate from the communications module 409, such as modem 427, or other means for establishing communications over the WAN 429, such as the Internet 431 or other type of computer network. It will be appreciated that the network connections shown are illustrative and other means of establishing a communication link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 419 used by the computing device 401, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 401. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 401. Such a processor may execute computer-executable instructions stored on a computer-readable medium. In an example, the systems and apparatus described herein may correspond to the computing device 401. A computer-readable medium (e.g., ROM 407) may store instructions that, when executed by the processor 403, may cause the computing device 401 to perform the functions as described herein.

Figure 6:
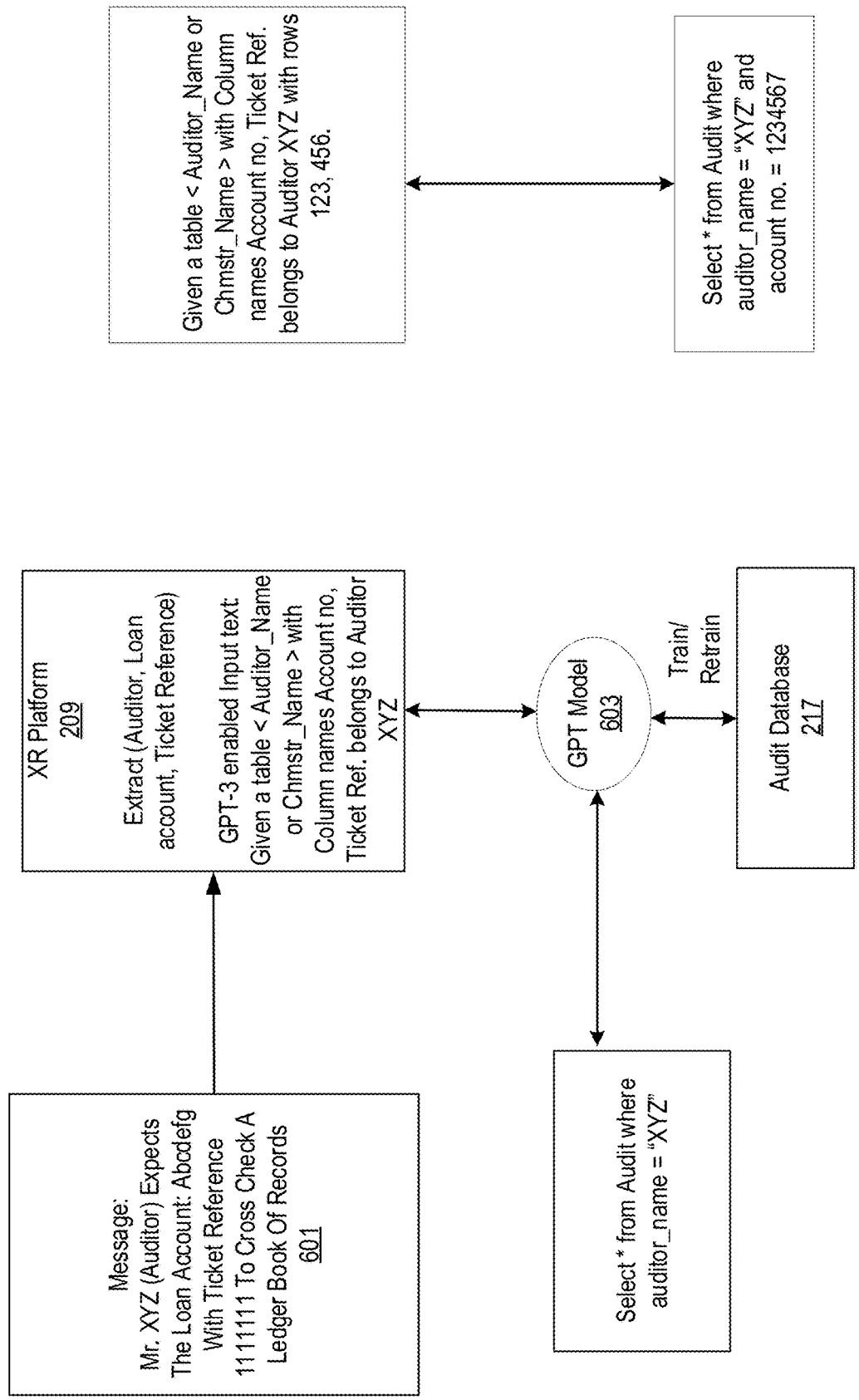
FIG. 6 shows an illustrative data flow diagram involving a contextual linguistic engine for an XR platform in accordance with one or more illustrative aspects described herein.

FIG. 6 shows an illustrative data flow diagram involving a contextual linguistic engine (e.g., the contextual linguistic engine 213) for an XR platform (e.g., the XR platform 209) in accordance with one or more illustrative aspects described herein. Referring to FIG. 6, a message 601 may comprise an audit request. For example, the message 601 may be an email that indicates that "Mr. XYZ (Auditor) expects the loan account: abcdefg with ticket reference 1111111 to cross check a ledger book of records." The XR platform 209 may receive the message 601 and extract the keywords from the audit request. The keywords may comprise auditor, loan account, and ticket reference. The XR platform 209 may convert the keywords of the audit request into GPT-3 enabled input text:

"Given a table <Auditor_Name or Chmstr_Name> with Column names Account no. Ticket Ref. belongs to Auditor XYZ."

The GPT-3 enabled input text may be used as an input for a GPT model 603. The GPT model 603 may generate human-like text based on the GPT-3 enabled input text. For example, the GPT model 603 may generate a query:

"Select * from Audit where auditor_name='XYZ'"

based on the above GPT-3 enabled input text. The GPT model 603 may also be trained and retrained based on the data in the audit database 217.

In another example, as shown in FIG. 6, the XR platform 209 may convert the keywords of an audit request into GPT-3 enabled input text:

"Given a table <Auditor_Name or Chmstr_Name> with Column names Account no, Ticket Ref. belongs to Auditor XYZ with rows 123, 456."

Based on that GPT-3 enabled input text, the GPT model 603 may generate a query:

"Select * from Audit where auditor_name="XYZ" and account no.=1234567."

Figure 7:
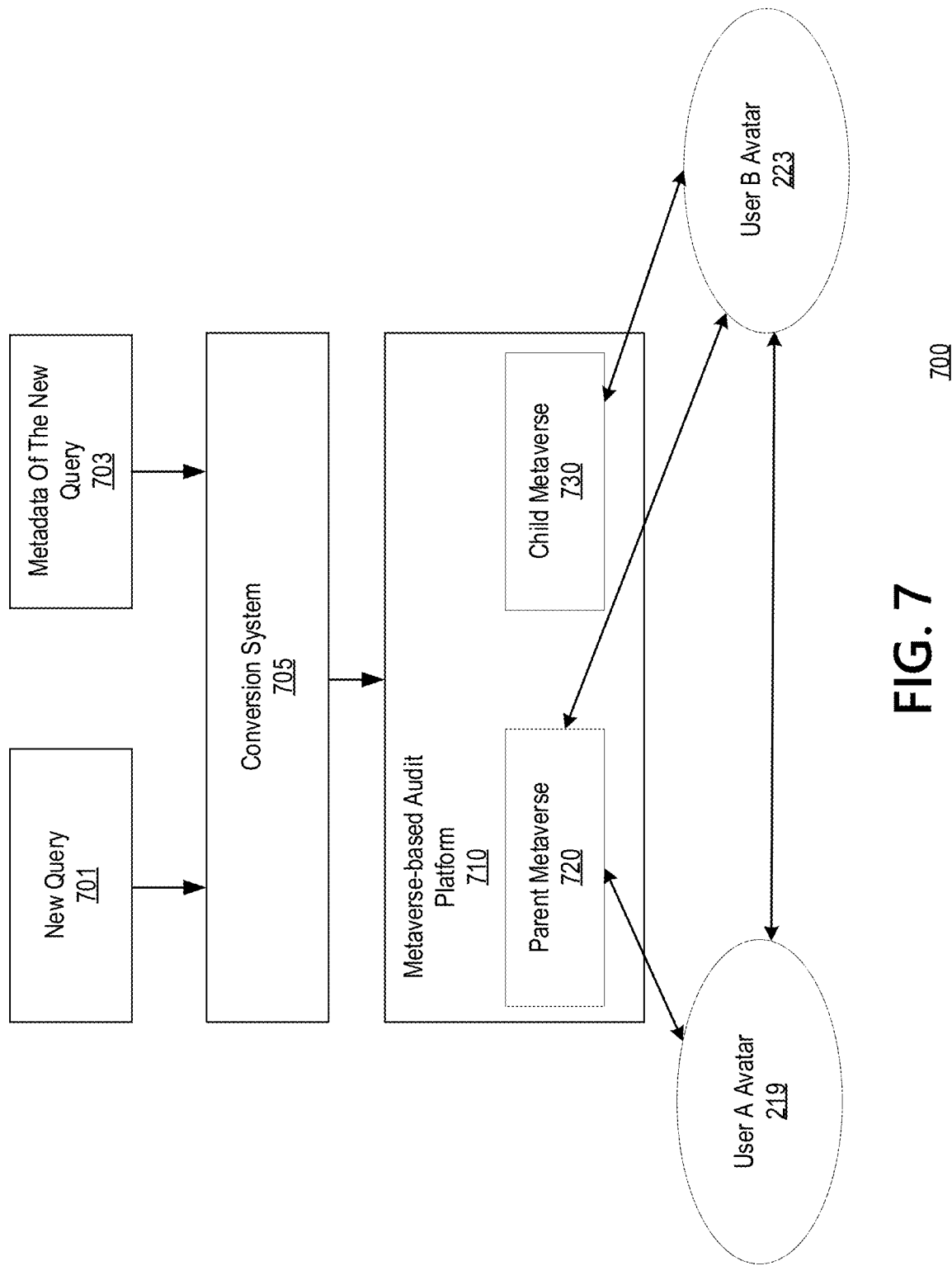
FIG. 7 shows an illustrative data flow diagram for in accordance one or more illustrative aspects described herein.

FIG. 7 shows an illustrative data flow diagram in accordance one or more illustrative aspects described herein. A query 701 (e.g., a database query) may be generated based on an audit request (e.g., a newly received audit request). As described herein, the XR platform 209 may generate the query 701 based on the keywords of the audit request. The XR platform 209 may also determine the metadata of the query 703. The query 701 and the metadata of the query 703 may be sent to a conversion system 705 (e.g., the conversion system 203, the XR interaction layer 215). The conversion system 705 may convert the query 701 and/or the metadata of the query 703 into 3D visual content based on, for example, a GAN algorithm. The conversion system 705 may send the 3D visual content of the query and the metadata of the query to a metaverse-based audit platform 710 (e.g., the XR platform 209). The metaverse-based audit platform 710 may be a collaborative metaverse application that facilitates and manages responses to audit requests.

Various users (e.g., auditors, regulators, financial analysts) may have avatars and may log into the metaverse-based audit platform 710 based on their user profiles. The user profiles may include user's authentications and/or authorizations, and indicate whether the user is authorized to access a particular metaverse (e.g., a parent metaverse, a child metaverse, a group, a space or room in a simulated world).

The metaverse-based audit platform 710 may comprise a parent metaverse 720 and a child metaverse 730. Each of the parent metaverse 720 and the child metaverse 730 may be a virtual computing environment (e.g., a simulation application) that allows users to interact with each other in real time. The parent metaverse 720 may be a public (semi-public) metaverse that is available to the user A 221 and other users (e.g., third parties). The child metaverse 730 may be a private metaverse that is available only to the user A 221 and other authorized users of a financial institution. In some examples, only some employees of the financial institution may have access to the child metaverse 730. User B avatar 223 may not have access to the child metaverse 730. The parent metaverse 720 and the child metaverse 730 may be two separate simulation applications or two different groups or environments (e.g., simulated worlds) on a same simulation application.

A user may move from the parent metaverse 720 to the child metaverse 730 and vice versa based on the user's profile. The user profile may indicate whether the user has access to either the parent metaverse 720 to the child metaverse 730. In the parent metaverse 720, user B avatar 223 may send an audit request to user A avatar 219, and may view a response to the audit request in the 3D form. User A avatar 219 may receive the audit request in the parent metaverse 720. After receiving the audit request, user A avatar 219 may move to the child metaverse 730 to determine a response to the audit request.

In the child metaverse 730, user A avatar 219 may receive a response to the audit request from the metaverse-based audit platform 710. Additionally, user A avatar 219 may receive a query associated with the audit request. The query may be in the 3D form. Based on the interactions with user B avatar 223, user A avatar 219 may determine that the query needs to be modified and may instruct an immersive query modulation engine to modify (or modulate) the query. The immersive query modulation engine may be part of the XR platform 209 and/or the contextual linguistic analysis engine 213. The modified query may be sent back to the metaverse-based audit platform 710. The metaverse-based audit platform 710 may use the modified query for one or more heterogeneous systems and may retrieve additional or modified data from the one or more heterogeneous systems. The metaverse-based audit platform 710 may then generate a modified response to the audit request based on the additional or modified data, and send the modified response to user B 225 and/or user A 221.

When user B avatar 223 interacts with user A avatar 219 in the parent metaverse 720, a log may be generated to record the interaction. For example, user A avatar 219 may provide a response for the audit request to user B avatar 223, a log may be generated and saved to document the response. Additional measures may be taken to comply with regulatory requirements.

Figure 8:
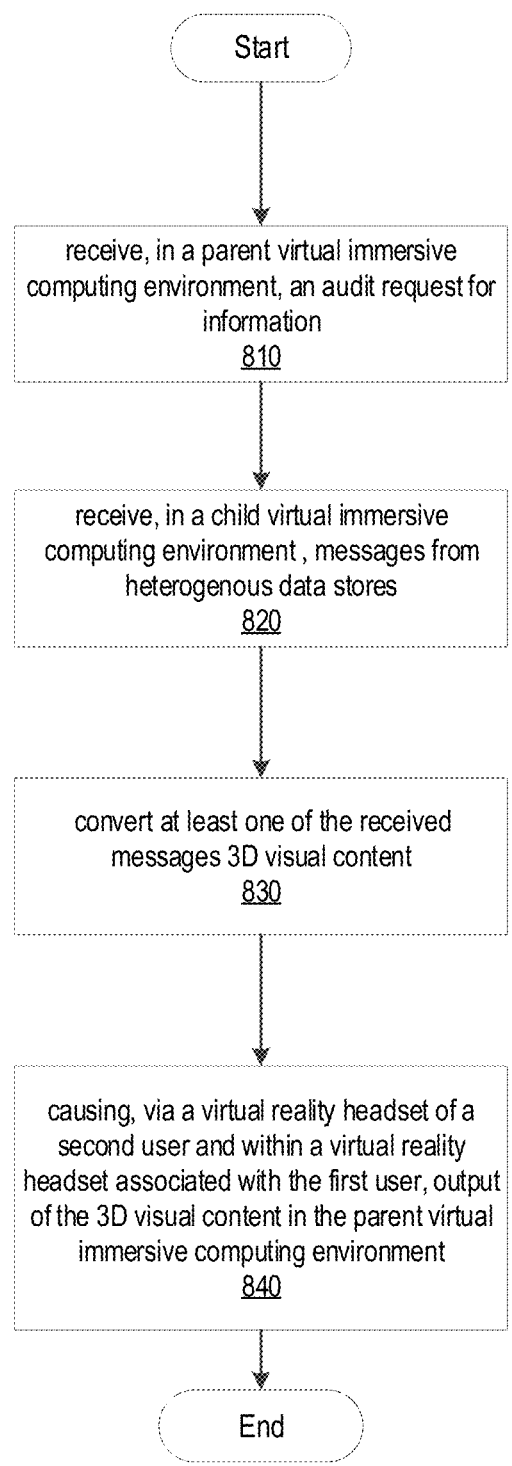
FIG. 8 shows an illustrative flowchart in accordance one or more illustrative aspects described herein.

FIG. 8 depicts an illustrative method for providing a response to a request in a virtual computing environment in accordance with one or more example embodiments. The method may involve a collaborative metaverse application. Referring to FIG. 8, at step 810, a computing device (e.g., the conversion system 203, the XR server 207, the XR platform 209) having at least one processor, a communication interface, and memory may receive, in a parent virtual immersive computing environment and from a first user (e.g., user B 225) or from the message system 201, an audit request for information. The first user may have access to the parent virtual immersive computing environment. At step 820, the computing device may receive, in a child virtual immersive computing environment, messages from heterogeneous data stores. At step 830, the computing device may convert at least one of the received messages into 3D visual content. For example, the computing device may convert, using a contextual linguistic engine in an XR platform and based on a GAN algorithm, the at least one of the received messages into 3D visual content. At step 840, the computing device may cause, via a virtual reality headset of a second user (e.g., user A 221) and within a virtual reality headset associated with the first user, output of the 3D visual content in the parent virtual immersive computing environment. The second user may have access to the parent virtual immersive computing environment and the child virtual immersive computing environment.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims. One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method involving a collaborative metaverse application, the method comprising:
   receiving, in a parent virtual immersive computing environment, by a computing device and from a first user represented virtually in the parent immersive computing environment by a first user avatar, an audit request for information, wherein the first user and the first user avatar have access to the parent virtual immersive computing environment;
   receiving, in a child virtual immersive computing environment and by the computing device, two-dimensional messages from heterogeneous data stores;
   converting, based on metadata associated with a query generated from the received two-dimensional messages, at least one of the received two-dimensional messages into three-dimensional visual content; and
   causing, via a virtual reality headset of a second user represented virtually in the parent virtual immersive computing environment and the child virtual immersive computing environment by a second user avatar and within a virtual reality headset associated with the first user that provides virtual reality for the first user including displaying the first user avatar and the second user avatar and enabling interaction of the first user avatar and the second user avatar, output and display of the three-dimensional visual content in the parent virtual immersive computing environment, wherein the second user has access to the parent virtual immersive computing environment and the child virtual immersive computing environment.

2. The method of claim 1, wherein:
   the first user avatar and the second user avatar are configured to communicate via three-dimensional messages in the parent virtual immersive computing environment.

3. The method of claim 1, wherein the converting comprises converting, using a contextual linguistic engine in an extended reality platform and based on a generative adversarial network (GAN) algorithm, the at least one of the received messages into the three-dimensional visual content.

4. The method of claim 1, wherein the first user is not allowed to access the child virtual immersive computing environment.

5. The method of claim 1, further comprising:
   extracting keywords from the messages;
   mapping the keywords to stored objects in a database;
   generating, using a contextual linguistic engine, based on the mapped keywords and a query generator transformer, a plurality of database queries, wherein each of the plurality of database queries is specific to a respective one of the heterogeneous data stores; and
   receiving, from each of the heterogeneous data stores, a response to a respective one of the plurality of database queries.

6. The method of claim 1, wherein the parent virtual immersive computing environment and the child virtual immersive computing environment are associated with the collaborative metaverse application.

7. The method of claim 1, further comprising:
   causing output of an interactive selection option associated with the three-dimensional visual content, wherein selection of the interactive selection option causes approval of the three-dimensional visual content.

8. An apparatus, comprising:
at least one processor;
memory storing computer-readable instructions that, when executed by the at least one processor, cause the apparatus to:
receive, in a parent virtual immersive computing environment and from a first user represented virtually in the parent virtual immersive computing environment by a first user avatar, an audit request for information, wherein the first user and the first user avatar have access to the parent virtual immersive computing environment;
receive, in a child virtual immersive computing environment, two-dimensional messages from heterogeneous data stores;
convert, based on metadata associated with a query generated from the received two-dimensional messages, at least one of the received two-dimensional messages into three-dimensional visual content; and
cause, via a virtual reality headset of a second user represented virtually in the parent virtual immersive computing environment and the child virtual immersive computing environment by a second user avatar and within a virtual reality headset associated with the first user that provides virtual reality for the first user including displaying the first user avatar and the second user avatar and enabling interaction of the first user avatar and the second user avatar, output and display of the three-dimensional visual content in the parent virtual immersive computing environment, wherein the second user has access to the parent virtual immersive computing environment and the child virtual immersive computing environment.

9. The apparatus of claim 8, wherein:
the first user avatar and the second user avatar are configured to communicate via three-dimensional messages in the parent virtual immersive computing environment.

10. The apparatus of claim 8, wherein the instructions, when executed by the at least one processor, cause the apparatus to convert by converting, by a contextual linguistic engine in an extended reality platform and based on a generative adversarial network (GAN) algorithm, the at least one of the received messages into the three-dimensional visual content.

11. The apparatus of claim 8, wherein the first user is not allowed to access the child virtual immersive computing environment.

12. The apparatus of claim 8, wherein the instructions, when executed by the at least one processor, cause the apparatus to:
extract keywords from the messages;
map the keywords to stored objects in a database;
generate, using a contextual linguistic engine, based on the mapped keywords and a query generator transformer, a plurality of database queries, wherein each of the plurality of database queries is specific to a respective one of the heterogeneous data stores; and
receive, from each of the heterogeneous data stores, a response to a respective one of the plurality of database queries.

13. The apparatus of claim 8, wherein the parent virtual immersive computing environment and the child virtual immersive computing environment are associated with a collaborative metaverse application.

14. The apparatus of claim 8, wherein the instructions, when executed by the at least one processor, cause the apparatus to:
cause output of an interactive selection option associated with the three-dimensional visual content, wherein selection of the interactive selection option causes approval of the three-dimensional visual content.

15. One or more non-transitory computer-readable media storing instructions that, when executed, cause:
receiving, in a parent virtual immersive computing environment and from a first user represented virtually in the parent virtual immersive computing environment by a first user avatar, an audit request for information, wherein the first user and the first user avatar have access to the parent virtual immersive computing environment;
receiving, in a child virtual immersive computing environment, two-dimensional messages from heterogeneous data stores;
converting, based on metadata associated with a query generated from the received two-dimensional messages, at least one of the received two-dimensional messages into three-dimensional visual content; and
causing, via a virtual reality headset of a second user represented virtually in the parent virtual immersive computing environment and the child virtual immersive computing environment by a second user avatar and within a virtual reality headset associated with the first user that provides virtual reality for the first user including displaying the first user avatar and the second user avatar and enabling interaction of the first user avatar and the second user avatar, output and display of the three-dimensional visual content in the parent virtual immersive computing environment, wherein the second user has access to the parent virtual immersive computing environment and the child virtual immersive computing environment.

16. The one or more non-transitory computer-readable media of claim 15, wherein:
the first user avatar and the second user avatar are configured to communicate via three-dimensional messages in the parent virtual immersive computing environment.

17. The one or more non-transitory computer-readable media of claim 15, wherein the instructions, when executed, cause the converting by causing converting, by a contextual linguistic engine in an extended reality platform and based on a generative adversarial network (GAN) algorithm, the at least one of the received messages into the three-dimensional visual content.

18. The one or more non-transitory computer-readable media of claim 15, wherein the first user is not allowed to access the child virtual immersive computing environment.

19. The one or more non-transitory computer-readable media of claim 15, wherein the instructions, when executed, further cause:
extracting keywords from the messages;
mapping the keywords to stored objects in a database;
generating, using a contextual linguistic engine, based on the mapped keywords and a query generator transformer, a plurality of database queries, wherein each of the plurality of database queries is specific to a respective one of the heterogeneous data stores; and
receiving, from each of the heterogeneous data stores, a response to a respective one of the plurality of database queries.

20. The one or more non-transitory computer-readable media of claim 15, wherein the parent virtual immersive computing environment and the child virtual immersive computing environment are associated with a collaborative metaverse application.

* * * * *